US012624253B2

(12) United States Patent
Schnöll et al.

(10) Patent No.:  US 12,624,253 B2
(45) Date of Patent:      May 12, 2026

(54) METHOD FOR PREPARING AN ADHESIVE TAPE OR MOLDING MASS

(71) Applicant: Technische Universität Wien, Vienna (AT)

(72) Inventors: Christoph Schnöll, Vienna (AT); Robert Liska, Schleinbach (AT); Patrick Knaack, Vienna (AT); Moritz Mitterbauer, Vienna (AT); Daniel Grunenberg, Vienna (AT)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 883 days.

(21) Appl. No.: 17/794,427

(22) PCT Filed: Jan. 22, 2021

(86) PCT No.: PCT/EP2021/051447
§ 371 (c)(1),
(2) Date: Jul. 21, 2022

(87) PCT Pub. No.: WO2021/148602
PCT Pub. Date: Jul. 29, 2021

(65) Prior Publication Data
US 2023/0078469 A1      Mar. 16, 2023

(30) Foreign Application Priority Data

Jan. 23, 2020    (AT) .................................... A 19/2020
Jan. 23, 2020    (AT) .................................... A 20/2020

(51) Int. Cl.
C09J 7/21          (2018.01)
C09J 7/35          (2018.01)
C09J 11/06         (2006.01)

(52) U.S. Cl.
CPC . C09J 7/21 (2018.01); C09J 7/35 (2018.01); C09J 11/06 (2013.01); *C09J 2301/408* (2020.08); *C09J 2301/416* (2020.08)

(58) Field of Classification Search
None
See application file for complete search history.

(56) References Cited

U.S. PATENT DOCUMENTS

| | | | | | |
|---|---|---|---|---|---|
| 5,242,715 | A | * | 9/1993 | Schoen | C08G 59/687 |
| | | | | | 427/559 |
| 7,378,455 | B2 | * | 5/2008 | Lu | C08G 59/68 |
| | | | | | 522/74 |
| 10,738,146 | B2 | * | 8/2020 | Liska | C08G 59/4085 |
| 11,384,261 | B2 | * | 7/2022 | Demarez | C08L 63/00 |

| | | | | | |
|---|---|---|---|---|---|
| 2007/0267134 | A1 | * | 11/2007 | Konarski | C08G 59/24 |
| | | | | | 522/170 |
| 2019/0202953 | A1 | * | 7/2019 | Lesser | C08K 5/06 |
| 2023/0078469 | A1 | * | 3/2023 | Schnöll | C09J 7/30 |
| | | | | | 428/355 R |

FOREIGN PATENT DOCUMENTS

| | | | | | |
|---|---|---|---|---|---|
| DE | 102019208668 | A1 | * | 12/2020 | C09J 5/06 |
| WO | WO-2013156509 | A2 | * | 10/2013 | C08G 59/62 |
| WO | WO-2020249435 | A1 | * | 12/2020 | C09J 5/06 |

OTHER PUBLICATIONS

Bronze et al. Successful radical induced cationic frontal polymerization of epoxy-based monomers cy C-C labile compounds. Polymer Chemistry, vol. 6, pp. 8161-8167 (2015). (Year: 2015).*
Malik et al. Review on UV-Induced Cationic Frontal Polymerization of Epoxy Monomers. Polymers 2020, 12, 2146. (Year: 2020).*
Bomze et al. (2016). Radical induced Cationic Frontal Polymerization as a Versatile Tool for Epoxy Curing and Composite Production. Journal of Polymer Science. Part A, Polymer Chemistry, 54(23), 3751-3759. (Year: 2016).*
Sangermano et al. (2019), Photoinduced cationic frontal polymerization of epoxy-carbon fibre composites. Polym. Int., 68: 1662-1665. (Year: 2019).*
Mariani et al. (2004), UV-ignited frontal polymerization of an epoxy resin. J. Polym. Sci. A Polym. Chem., 42: 2066-2072 (Year: 2004).*
Falk et al. (2005), Photoactivated Cationic Frontal Polymerization. Macromol. Symp., 226: 97-108. (Year: 2005).*
Knaack et al. (2019), Radical induced cationic frontal polymerization in thin layers. J. Polym. Sci. Part A: Polym. Chem., 57: 1155-1159. https://doi.org/10.1002/pola.29375 (Year: 2019).*
Ozeren et al. Effects of epoxy, hardener, and diluent types on the hardened state properties of epoxy mortars. Construction and Building Materials, vol. 187, Oct. 30, 2018, pp. 360-370. (Year: 2018).*

* cited by examiner

*Primary Examiner* — Sanza L. McClendon
(74) *Attorney, Agent, or Firm* — Panitch Schwarze Belisario & Nadel LLP

(57)                ABSTRACT

A polymerizable composition which may be used as an adhesive mass in a method for preparing an adhesive tape or as molding mass in a method for preparing molded articles is provided. The polymerizable composition contains: A) a thermal cationic initiator, or B) a combination of a cationic photoinitiator and a thermal free-radical initiator for inducing the polymerization of the cationically polymerizable monomers in such an amount that the heat energy released during polymerization is sufficient for cleaving the thermal initiator. The adhesive mass is curable via a local impulse a) of thermal energy orb) of thermal energy and/or radiation energy through frontal polymerization; or the molding mass is initially prepared by mixing all components and then molded into the desired shape, whereafter its frontal polymerization is induced by a local impulse a) of thermal energy and/or b) of radiation energy in order to prepare a cured molded article.

17 Claims, No Drawings

METHOD FOR PREPARING AN ADHESIVE TAPE OR MOLDING MASS

CROSS-REFERENCE TO RELATED APPLICATIONS

This application is a Section 371 of International Application No. PCT/EP2021/051447, filed Jan. 22, 2021, which was published in the German language on Jul. 29, 2021 under International Publication No. WO 2021/148602 A1, which claims priority under 35 U.S.C. § 119(b) to Austrian Application No. A 19/2020, filed Jan. 23, 2020, and Austrian Application No. A 20/2020, filed Jan. 23, 2020, the disclosures of which are incorporated herein by reference in their entireties.

The invention relates to the preparation of adhesive tapes and molded articles using special polymerizable compositions, as well as adhesive tapes and molded articles thus prepared.

STATE OF THE ART

Adhesive masses curable via polymerization have been known for various types of resin compositions for a long time, curing of which can be induced in many different ways such as thermally, photochemically or by absorption of humidity. However, all embodiments have the common disadvantage that the surface of the adhesive mass entering into contact with the adhesion partners to be bonded always has to be completely activated, for example, heated or irradiated, in order to induce polymerization in the entire adhesive mass.

Additionally, if large areas of the surfaces of two adhesion partners are to be bonded, where sometimes a transfer adhesive tape is used, i.e., a carrier-free adhesive tape that is protected on both sides with a release sheet before use, the adhesion process is particularly cumbersome because often, depending on the nature of the adhesive mass, both adhesive surfaces of the transfer adhesive tape have to be completely activated. For this purpose, a release sheet has to be removed, the adhesive tape has to be activated on one side and then adhered to one of the bonding partners, whereafter the opposite adhesive surface also has to be activated after removing the other release sheet, before it is brought into contact with the second bonding partner, which usually has to be pressed on. However, depending on the speed of the polymerization induced by the activation, time frames for these processes are strongly limited, often to only a few seconds, or it takes a very long time, after the two bonding partners have been bonded, for the adhesive mass to harden sufficiently in order to guarantee a stable connection between the bonding partners, for example, several hours up to 1 to 2 days.

Herein, the term of "adhesive tape" includes, in addition to the common embodiments of carrier tapes adhesively coated on one or both sides and carrier-free transfer adhesive tapes, also fixing tapes or repair wrapping tapes as disclosed in, for example, US 2015/047769 A1. These are mostly porous or perforated or foamed carrier tapes that are impregnated or soaked with a polymerizable composition and are, during use, wrapped around a location to be repaired and then cured in order to prepare a dimensionally stable, cured composition. According to US 2015/047769 A1 such a porous carrier tape is, for example, impregnated with a composition curable by reaction with water, wherein the water is to be added immediately before using the composition, which thus constitutes a two-component system.

Subsequently, the tape is once or twice wrapped around a defective workpiece, for example, around a location around a hole in a pipe, or around two pieces to be bonded to each other, for example, around a fracture of a broken bar or a broken pipe, and allowed to cure, which usually takes a few minutes. In such cases, the adhesive strength of the polymerizable composition as "adhesive mass" of such tapes is rather low because they only serve to prevent slipping off from the application site before the curing process starts, while fixing or repairing is achieved by the formation of a dimensionally stable sheath around the workpiece(s) during curing. The embodiments disclosed in US 2015/047769 A1 specifically have the general disadvantage of two-component polymerization systems, i.e., that there is only a relatively short pot life after mixing of the two components of the curable composition in order to move the tape to the desired position before curing reaches a point after which the mass cannot be firmly wrapped around the workpiece(s) anymore.

For various types of resin compositions, molding masses curable by polymerization have also been known for a long time, the curing of which can be induced in many different ways such as thermally, photochemically or by absorption of humidity. The latter are, for example, disclosed in WO 2008/065406 A1, which describes a silicone elastomer mass vulcanizable by H2O absorption at room temperature. However, all these embodiments have the common disadvantage that either only relatively thin layers or bodies of the molding mass can be provided because the penetration depth of irradiation or water molecules is rather low, i.e., in the range of millimeters or a few centimeters, or the masses have to be heated to very high temperatures in order to induce thermal curing of the molding masses also in greater depth. In addition, there are numerous two component compositions where the polymerizable composition and the curer are provided separately before use, which have, however, the disadvantage, that there is only a very short pot life after mixing of the two components for handling the mixture before curing reaches a point after which the mass is not moldable anymore. US 2009/155485 A1 discloses a partial solution for this problem by suggesting a wood putty that is curable by free-radical frontal photopolymerization of multifunctional acrylate monomers, i.e., which contains a free-radical photoinitiator and a thermal/free radical initiator, wherein the photoinitiator forms free radicals when irradiated with UV light, which induce the free-radical polymerization and crosslinking of acrylates, whereafter the heat development of the exothermic polymerization reactions induces cleavage of the thermal initiators into free radicals that are supposed to maintain further polymerization of the monomers until the mass is thoroughly cured. The thickness of a wood putty mass layer curable in this way that is applied to a wooden surface to be repaired is given with 1 cm up to 10 cm, and for the curing rate a preferred value under 5 min, preferably under 1 min, is given. Preferred thermal initiators mentioned are those with a 1 hour half-life temperature of less than 90° C., and examples mentioned are various peroxides as well as azobisisobutyronitrile (AIBN) and homologues thereof, with lauroyl peroxide and azobisisohepatonitrile being particularly preferred.

However, in the exemplary embodiments of US 2009/155485 A1 only holes having a depth of 1.5 cm (and a diameter of 1 cm) were filled with the mass to be cured so that the particularly preferred curing rate of 1 min assumingly refers to this depth, which corresponds to a value of 0.67 cm/min. In addition, all experiments required several irradiation passes with UV light ("a series of light exposure"), and the actual presence of a frontal polymerization reaction at a depth of more than 1 cm was only assumed, and it was explicitly asserted that instead of the heat released due to the free-radical polymerization induced by irradiation, the simultaneous heating of the wood might have caused the further thermal polymerization of the acrylates. It was thus not confirmed whether the wood putty disclosed in US 2009/155485 A1 actually represents a molding mass curable by frontal photopolymerization.

In addition to the small possible molding mass thicknesses of max. 10 cm and the necessity to irradiate the mass several times and/or for a longer time (e.g. for 300 s) in order to cure thicknesses beyond 12 cm, the embodiments disclosed in US 2009/155485 A1 also have the disadvantage that masses based on acrylate monomers are usually subject to strong shrinking during curing so that a high content of fillers is indispensable in order to keep it to a limit, which is why preferred filler contents of more than 70 wt. % are disclosed. An additional problem arising with exclusively radically curing systems, particularly with frontal photopolymerization where the goal is an irradiation time for inducing polymerization as short as possible, which of course only allows for the formation of a limited number of free radicals from the radical photoinitiator molecules, is the inhibition of polymerization caused by oxygen in the air. For this reason, the examples disclosed in US 2009/155485 A1 all comprise several irradiations with a total duration of several minutes.

In addition, storage stability of the compositions is also relatively low because of the desired low 1 hour half-life temperatures of the peroxides and azonitriles mentioned in US 2009/155485 A1 as preferred thermal initiators.

Against this background, the goal of the invention was, on the one hand, the development of an adhesive tape that at least partially eradicates the above disadvantages, and on the other hand the development of an improved method for preparing molded articles by using frontal polymerizable molding masses that at least partially solve the above disadvantages.

SUMMARY OF THE INVENTION

In a first aspect, the present invention achieves this goal by providing a method for preparing adhesive tapes using a polymerizable composition as an adhesive mass that comprises cationically polymerizable monomers, at least one cationic polymerization initiator and optionally one or more additives, wherein the polymerizable composition comprises A) a thermal cationic initiator, or B) a combination of a cationic photoinitiator and a thermal free-radical initiator for inducing the polymerization of the cationically polymerizable monomers in such an amount that the heat energy released during polymerization is sufficient for causing cleavage of the thermal initiator, so that the adhesive mass is curable via a local impulse a) of thermal energy or b) of thermal energy and/or radiation energy through frontal polymerization.

Using such a frontally polymerizable composition as an adhesive mass of adhesive tapes eliminates all of the disadvantages mentioned above:

In frontal polymerization, a type of polymerization reactions where the reaction zone travels through the polymerizable material, no full-surface activation of the polymerizable material is necessary, but it is sufficient to activate, i.e., to heat or irradiate, any location of the composition, which may be at the edge or in the middle of the adhesive mass. Consequently, the reaction is self-sustaining because further molecules of the thermal initiator are continuously cleaved due to the reaction enthalpy released during polymerization so that a reaction front propagates from the activation site in all directions through the entire mass until all monomers are consumed.

Due to this reaction mechanism, it is not necessary to further activate the adhesive mass for a longer period, but a single short impulse of thermal energy and/or radiation energy, for example, in the range of a few seconds, is fully sufficient to stimulate the polymerization.

In addition, this type of polymerization initiation does not require any complex equipment, but only, for example, a UV or IR lamp such as a mercury vapor lamp or LED UV lamp, or even only a simple lighter or a flat iron or the like as heat source.

And finally, the two bonding partners—and even two bonding partners to be bonded over large areas of their surfaces—can be bonded before polymerization of the adhesive mass is induced because the initiation impulse has to be supplied only at an outer edge of the composition, which can, as mentioned above, be done using a lamp the beam of which can, for example, also be directed into a narrow gap between the bonding partners, i.e., for example, from the side, or into a small opening such as a through hole in one of the bonding partners. When using the adhesive tape according to the first aspect of the invention as fixing or repair wrapping tape as mentioned before, it is sufficient, for example, to provide the initiation impulse to the polymerizable composition at the free end of the tape after the tape has been wrapped around the workpiece(s).

In a second aspect, the present invention achieves the above goal by providing a method for preparing molded articles using a polymerizable composition as a molding mass that comprises cationically polymerizable monomers, at least one cationic polymerization initiator, and optionally one or more additives, wherein the polymerizable composition comprises A) a thermal cationic initiator, or B) a combination of a cationic photoinitiator and a thermal/free-radical initiator for inducing the polymerization of the cationically polymerizable monomers in such an amount that the heat energy released during polymerization is sufficient for causing cleavage of the thermal initiator; and a molding mass is initially prepared by mixing all components contained therein and then molded into the desired shape, whereafter its frontal polymerization is induced by a local impulse of thermal energy and/or radiation energy in order to prepare a cured molded article.

Here, the composition used according to the second aspect of the present invention does not only offer the possibility to induce the curing of the composition based on cationically polymerizable monomers optionally by means of thermal energy or radiation energy or both, but is also characterized by high polymerization rates as well as the fact that a single short impulse of thermal energy and/or radiation energy in the range of only a few seconds at any site of the composition molded into the desired shape is sufficient to initiate its polymerization. Therefore, polymerization initiation in these embodiments of the invention does not require any complex equipment as heat source, either, but only a UV or IR lamp such as a mercury-vapor or LED UV lamp, or even only a simple lighter or a flat iron or the like.

The high rate with which the polymerization front propagates through the composition in this case was particularly surprising due to the fact that cationic polymerization reactions usually proceed considerably slower than with radical curing. In addition, the preferably used compositions are characterized by high storage stability and good manageability compared to the state of the art.

According to the second aspect of the present invention, the polymerizable composition used as a molding mass i) may be flowable before molding and, for molding, may be introduced as a casting mass or casting resin into a casting mold or may be applied as a coating onto an uneven surface; or ii) may be spreadable-pasty before molding and, for molding, may be applied as a spackle, filler or mortar onto uneven surfaces; or iii) may be solid, but plastically moldable, before molding and may be used as a modelling mass or putty to be molded into the desired shape manually or by means of a tool; whereafter it is frontally polymerized in this shape.

In preferred embodiments, at least in the above cases ii) and iii), one or more viscosity modifiers, thickeners and/or rheology modifiers are added to the polymerizable composition according to the second aspect in order to adjust predefined viscosities or flow properties allowing for easily molding the composition into the desired shape. For example, organic layer silicates as well as cellulose, starch or acrylate thickeners are suitable for this purpose.

Since a short impulse of thermal and/or heat energy at any site of the composition is sufficient, the energy supply resulting therefrom can be either at the edge or in the middle of the molding mass so that the composition may also be molded into very complex shapes and still be cured in a simple and fast manner, for example, by short irradiation with a UV LED lamp through a small opening of a casting mold or the like.

The selection of the initiator system, i.e., whether a thermal cationic initiator alone or a combination of a cationic photoinitiator and a thermal free-radical initiator is used for inducing frontal polymerization, depends on the specific parameters in each case. Here, the type of the adhesive bonding to be achieved and the characteristics of the bonding partners, on the one hand, and the type and structure of the molded article, on the other hand, have a significant impact. Adhesive masses and molding masses containing exclusively one or more thermal cationic initiators are cheaper to prepare, but the selection of monomers is often somewhat limited because conventional thermal initiators are not able to induce a frontal polymerization of less reactive monomers such as bisphenol A diglycidyl ether (BADGE) or oligomers thereof. The use of combinations of cationic photoinitiators and thermal free-radical initiators is associated with somewhat higher costs, but heat development during frontal polymerization is more controllable because a reaction cascade proceeds between the two initiators and the monomers and virtually any monomer to be polymerized cationically can be used in the adhesive mass or molding mass.

The mentioned reaction cascade that occurs by using a combination of a cationic photoinitiator and a thermal free-radical initiator is induced by irradiating any location of the adhesive mass or molding mass with radiation of a suitable wavelength, usually UV light, which transfers the cationic photoinitiator into an excited state, which is subsequently decomposed with the formation of a strong acid, called photoacid, which is why such initiators are also called photoacid generators. As a consequence, the photoacid protonates a cationically polymerizable monomer, which stimulates the exothermic polymerization reaction with further monomer molecules. The heat released during this process results in the decomposition of the thermal free-radical initiator under formation of free radicals which subsequently react with molecules of the cationic initiator and again cause the formation of a strong acid, which again causes the polymerization of further monomers, etc. If there are sufficient amounts of the two initiators, this front travels through the entire mixture to be polymerized until the polymerization stops due to the lack of further non-reacted monomers.

According to the invention, the thermal cationic initiator is not particularly limited and may preferably be selected from common alkylbenzylsulfonium or alkylarylbenzylsulfonium, benzylpyridinium, methylimidazonium, benzylpyrazinium or substituted benzylphosphonium salts of non-nucleophilic bases of very strong acids, more preferably salts of B(C6F5)4-, SbF6-, AsF6-, PF6- or BF4- or the tetrakis(perfluoro-t-butyloxy)aluminate anion as well as mixtures thereof. Particularly preferably it is selected from alkylbenzylsulfonium or alkylarylbenzylsulfnoium salts of SbF6- or the tetrakis(perfluoro-t-butyloxy)aluminate anion, which have proven particularly useful in the past.

The cationic photoinitiator and the thermal free-radical initiator are not particularly limited, either, wherein in preferred embodiments of the invention, the cationic photoinitiator is selected from aryl-substituted iodonium, phosphonium, sulfonium, pyridinium or diazonium salts, more preferably diaryliodonium salts of non-nucleophilic bases of very strong acids, in particular again salts of B(C6F5)4-, SbF6-, AsF6-, PF6- or BF4- or salts of the tetrakis(perfluoro-t-butyloxy)aluminate anion as well as mixtures thereof; and/or the thermal free-radical initiator is selected from benzopinacol, dibenzoylperoxide, and azobis(isobutyronitrile).

In particular benzopinacol, i.e., 1,1,2,2-tetraphenyl-1,2-ethanediol, has proved to be particularly useful in earlier research; see, for example, WO 2017/035551 A1. And particularly preferred cationic photoinitiators due to their good initiator properties are (4-octyloxyphenyl)(phenyl)iodonium hexafluoroantimonate, bis-(4-dodecylphenyl)iodonium hexafluoroantimonate, (4-isopropylphenyl)(4'-methylphenyl)iodonium tetrakis(pentafluoro-phenyl)borate as well as iodonium salts of the tetrakis(perfluoro-t-butyloxy) aluminate anion.

In principle, any cationically polymerizable monomer can be used as monomer, wherein monovalent or multivalent epoxides (oxiranes), thiiranes (episulfides), oxtanes, lactams, lactones, lactides, glycolides, tetrahydofuran and mixtures thereof are to be preferred due to their availability, and epoxides, in particular epoxy-novolak prepolymers, are particularly preferred because they result in advantageous properties of the adhesive mass. However, ortho esters as well as other monomer classes modified with cationically polymerizable groups, e.g., silicones with epoxide groups, may also be used.

The proportion of the initiator or the initiator combination in the polymerizable composition is not particularly limited as long as the amount is sufficient in the respective case to maintain the front travelling through the adhesive mass, i.e., to continuously cleave molecules of the thermal initiator and cause polymerization reactions until all monomers are consumed.

In preferred embodiments of the sole use of one or more thermal cationic initiators, these are present in the composition in a proportion of 0.5 to 6 wt. %, more preferably 1 to 4 wt. %, in particular 1.5 to 2 wt. %, based on the total weight of the cationically polymerizable monomers, which guarantees a stable front during frontal polymerization with simultaneous moderate heat development.

When using the combination of a cationic photoinitiator and a thermal free-radical initiator or more than one of each, the initiator combination, in preferred embodiments, amounts to 0.5 to 12 wt. %, more preferably 1 to 6 wt. %, in particular 2 to 4 wt. %, based on the total weight of the cationically polymerizable monomers, for the same reason.

Here, the molar ratio of cationic photoinitiator and thermal free-radical initiator of the initiator combination is preferably 1:0.5 to 1:45, more preferably 1:2 to 1:10, in particular approximately 1:2 to 1:5, which results in advantageous polymerization rates for most common and preferred monomers.

In addition to initiators and monomers, the polymerizable composition used as an adhesive mass or molding mass according to the present invention may, of copurse, comprise further components which are not particularly limited, as long as they have no negative impact on the frontal polymerization and the adhesive effect of the mass achieved thereby.

In preferred embodiments, it contains additives selected from (in the case of the molding mass: optionally further) thickeners or rheological additives as well as coupling agents, tackifiers, network, impact strength or surface modifiers, film-forming agents, wetting agents, pigments, coloring agents, stabilizers, control agents, flame retardants, or fillers, in order to provide the adhesive mass or molding mass with the respective desired properties.

Possible network modifiers are, for example, monovalent or multivalent alcohols as well as polyalcohols such as PET, poly-THF or dendrimers comprising OH groups.

Film-forming agents that may be added are, for example, polymers such as ethylene-vinylacetate, acrylates, phenoxy resins, polyvinylalcohol, alkyd resins, urea resins, melamine resins, polyvinylchloride, rubber, polysaccharides, polyvinylpyrrolidone, polyethylene glycols, paraffins, polyamides or polyurethanes.

Suitable rheological additives or thickeners for the adhesive mass are, for example, as mentioned before with regard to the molding mass, organic layer silicates as well as cellulose, starch, or acrylate thickeners.

Possible fillers are, in both cases, for example, wood, melt polymers, e.g. polypropylene or polyamide powder, plastics, rubbers, aluminum, aluminum oxide, aluminum silicates, barium sulfate, calcium carbonate, calcium sulfate, carbon, copper, chalk powder, glass and glass microspheres, graphite, carbon black, iron, lead or other metals, kaolin, magnesium silicate, mica, silica sand, silicon carbide, silver, titanium dioxide, zinc, zirconium silicate, fumed silica, as well as glass and carbon staple fibers.

And tackifiers or coupling agents, which may particularly be used in the inventive adhesive mass, may principally be any low-molecular compound having a high glass transition temperature, for example, terpenes, synthetic resins, preferably those of C5-C6 aliphates or cycloaliphates and/or C6-C9 aromatics as recurring units, terpene phenolic resins or novolaks, but they are not limited thereto.

Alternatively or in addition to these additives, the composition mayn—in particular in embodiments using the initiator combination of cationic photoinitiator and thermal free-radical initiator—also contain radically polymerizable monomers in addition to the cationic polymerizable monomers in order to also conduct a radical polymerization in parallel with the cationic polymerization for curing the adhesive mass or molding mass, which allows for controlling the curing rate and the adhesive effect of the adhesive mass or the curing rate of the molding mass and consequently also the properties of the molded article made therefrom.

Preferably, such additional free-radical monomers are selected from common acrylates, methacrylates or acrylamides.

In preferred embodiments of the inventive use of a frontally polymerizable adhesive mass, first, the polymerizable composition is prepared by mixing all components contained therein, which is optionally heated in order to improve mixability and flowability, whereafter it is, as an adhesive mass, i) formed into a transfer adhesive tape, or
  ii) applied in the form of a layer onto a carrier, wherein the carrier is preferably selected from paper, fabrics, nonwoven materials, plastic foils, metal foils, foams or combinations thereof, which are each optionally fiberreinforced, and more preferably selected from glassfiber non-wovens or meshes.

When applying the adhesive mass onto a carrier, its surface facing away from the carrier is preferably provided with a release sheet in order to protect it before use, and during processing of the adhesive mass to a transfer adhesive tape, i.e., a carrier-free adhesive tape, both surfaces of the adhesive tape are most preferably protected with release sheets.

When preparing a fixing or repair wrapping tape, the adhesive mass is applied onto the carrier tape by means of impregnation. Here, the curable adhesive mass is, during mixing of the components, preferably heated to a temperature at which it is sufficiently flowable in order to be able to impregnate a porous or perforated carrier tape, for example, a glass-fiber nonwoven or mesh, on at least one side thereof, whereafter, during cooling, it solidifies to a solid layer that has penetrated the carrier tape on at least one side or has penetrated it completely. In these cases, the finished tape is again provided with a protective release sheet on at least one side or both sides thereof, depending on the extent to which the carrier has been penetrated by the adhesive mass.

In a further aspect, the present invention provides an adhesive tape that is prepared according to the above method using the frontally polymerizable adhesive mass according to the first aspect of the invention and that has the preferred properties described above.

Finally, the present invention also provides a molded article that is prepared according to the above method using the frontally polymerizable molding mass according to the second aspect of the invention and that also has the preferred properties described above.

EXAMPLES

In the following, the present invention is described in further detail by means of non-limiting exemplary embodiments that are only provided for illustrative purposes.

Examples 1 to 3—Adhesive Tapes with Carrier

From each of the following formulations comprising a combination of a cationic photoinitiator and a thermal free-radical initiator, an adhesive mass was prepared and then applied onto a carrier, whereafter the side of the mass facing away from the carrier was surface-modified with a melt polymer filler powder.

Example 1

| Component | Name | Amount (wt. %) |
|---|---|---|
| Cationic photoinitiator | Bis(4-tert-butylphenyl)iodonium tetrakis-(perfluoro-t-butyloxy)aluminate | 2 |
| Thermal free-radical initiator | 1,1,2,2-Tetraphenyl-1,2-ethanediol (benzopinacol) | 2 |
| Monomer | Epoxy novolak resin epoxy functionality: 3.8 | 80 |
| Monomer | Bisphenol A diglycidyl ether | 16 |
| | | Σ 100 |

Example 2

| Component | Name | Amount (wt. %) |
|---|---|---|
| Cationic photoinitiator | (4-Isopropylphenyl)(4'-methylphenyl)iodonium tetrakis(pentafluorophenyl)borate | 3 |
| Thermal free-radical initiator | 1,1,2,2-Tetraphenyl-1,2-ethanediol (Benzopinacol) | 3 |
| Monomer | Epoxy novolak resin epoxy functionality: 3.8 | 75 |
| Monomer | Bisphenol A diglycidyl ether | 19 |
| | | Σ 100 |

Example 3

| Component | Name | Amount (wt. %) |
|---|---|---|
| Cationic photoinitiator | Bis(4-tert-butylphenyl)iodonium tetrakis-(perfluoro-t-butyloxy)aluminate | 3 |
| Thermal free-radical initiator | 2,2,7,7-Tetramethyl-4,4,5,5-tetraphenyl-3,6-dioxa-2,7-disilaoctane (Benzopinacol-bis(trimethylsilyl) ether) | 3 |
| Monomer | Epoxy novolak resin epoxy functionality: 3.8 | 75 |
| Monomer | Bisphenol A diglycidyl ether | 19 |
| | | Σ 100 |

Preparation of Adhesive Masses

From each the three formulations above, 200 g of adhesive mass were prepared by weighing in the thermal free-radical initiator, the cationic photoinitiator and the monomers in the given proportions and stirring them in a dissolver (e.g., IKA Ultra-Turrax) until a clear homogeneous solution was obtained.

Preparation of Adhesive Tapes

For preparing the carrier, a glass-fiber nonwoven tape having a width of 50 mm and a thickness of 0.5 mm plus a glass-fiber mesh tape self-adhesive on one side having a width of also 50 mm and a thickness of 0.25 mm were bonded to each other, whereafter one of the adhesive masses prepared above was applied to a nonwoven side of the carrier tape at a temperature of 50° C. and uniformly distributed on the carrier using a spatula so that a uniform thickness of the adhesive mass of 2 mm and a weight ratio of adhesive mass and carrier of 10:1 were obtained. Then, ethylene-vinyl acetate (EVA) copolymer powder was sprinkled as a melt polymer filler onto the mass in an amount of 5 parts per weight per 100 parts per weight of adhesive mass, on the surface of which it fused with the formulation. During cooling, the viscosity of the adhesive mass thus obtained increased until it was not flowable anymore, which resulted in an adhesive tape that was compact and flexible at room temperature.

Bonding of Bonding Partners

The adhesive tapes prepared as described above were each cut to a length of 10 cm and twice wrapped around a wooden bar, wherein the adhesive mass showed good initial bonding in all cases. Subsequently, the wrapping of the adhesive mass was, at one location, heated for 3 s using a lighter (Examples 1 and 3) or irradiated for 3 s using an LED UV lamp Omnicure Series 2000 (Example 2), with the flame or the lamp being kept at a distance of approximately 2 cm from the side of the adhesive tape. In all three cases, the polymerization reaction thus initiated travelled through the entire adhesive mass of the adhesive tape in the form of a "curing front". In this way, the adhesive masses of the three adhesive tapes cured completely within 30 s to 1 min, which corresponds to curing rates of approximately 10 to 20 cm/min.

Examples 4 to 6—Molding Mass

From the following formulations, each comprising a combination of a cationic photoinitiator and a thermal free-radical initiator, a flowable composition was prepared by mixing the polymerizable components (in amounts that together result in 100 wt. % of the composition), to which various additives were added (in wt. % amounts based on 100 wt. % of the composition without additives) in order to prepare a plastically moldable modelling mass as a molding mass, from which a molded article was subsequently prepared and cured by frontal polymerization according to the present invention.

Example 4

| Component | Name | Amount (wt. %) |
|---|---|---|
| Cationic photoinitiator | Bis(4-tert-butylphenyl)iodonium tetrakis-(perfluoro-t-butyloxy)aluminate | 1 |
| Thermal free-radical initiator | 1,1,2,2-T etraphenyl-1,2-ethanediol (Benzopinacol) | 3 |
| Monomer | Epoxy novolak resin epoxy functionality: 3.8 | 80 |
| Monomer | Bisphenol A diglycidyl ether | 16 |
| | | Σ 100 |
| Additives | | |
| Thixotropic agent (hydrophobic) | Fumed silica Aerosil ® R 812 S | 8 |
| Filler | Talc | 30 |

Example 5

| Component | Name | Amount (wt. %) |
|---|---|---|
| Cationic photoinitiator | Bis(4-tert-butylphenyl)iodonium tetrakis-(perfluoro-t-butyloxy)aluminate | 3 |

-continued

| Component | Name | Amount (wt. %) |
|---|---|---|
| Thermal free-radical initiator | 1,1,2,2-Tetraphenyl-1,2-ethanediol (Benzopinacol) | 3 |
| Monomer | Epoxy novolak resin epoxy functionality: 3.8 | 75 |
| Monomer | Bisphenol A diglycidyl ether | 19 |
| | | Σ 100 |
| Additives | | |
| Thixotropic agent (hydrophobic) | Fumed silica Aerosil ® R 812 S | 8.5 |
| Filler | Talc | 21.5 |
| Filler | Silica sand | 8.5 |

Example 6

| Component | Name | Amount (wt. %) |
|---|---|---|
| Cationic photoinitiator | Bis(4-tert-butylphenyl)iodonium tetrakis-(perfluoro-t-butyloxy)aluminate | 3 |
| Thermal free-radical initiator | 1,1,2,2-Tetraphenyl-1,2-ethanediol (Benzopinacol) | 3 |
| Monomer | Epoxy novolak resin epoxy functionality: 3.8 | 75 |
| Monomer | Bisphenol A diglycidyl ether | 19 |
| | | Σ 100 |
| Additives | | |
| Thixotropic agent (hydrophobic) | Fumed silica Aerosil ® R 812 S | 8 |
| Filler | Sodium alumosilicate | 30 |

Preparation of the Polymerizable Compositions

From each the three formulations above, a flowable polymerizable composition was prepared by weighing in the thermal free-radical initiator, the cationic photoinitiator and the monomers in the given proportions and stirring them in a dissolver (e.g., IKA Ultra-Turrax) until a clear homogeneous solution was obtained.

Preparation of the Molding Masses

To the flowable mixtures obtained as described above, the given amount of thixotropic agent was initially added at room temperature, whereafter the other additives were added under constant kneading until a homogeneous mass with Plasticine-like consistency was obtained that was easily moldable by hand and dimensionally stable thereafter.

In an identical manner as described above, with a suitable selection of the amounts of the components contained, i.e., of the polymerizable components as well as the additives, it is possible to prepare, rather than plastic molding masses, flowable masses, which can be used as casting masses or coatings, or spreadable, paste-like masses, which can be used as a spackle, filler or mortar. The ratios of monomers and additives is of particular importance in this regard, in particular those of viscosity modifiers, thickeners and rheology modifiers, which may optionally be omitted entirely in order to adjust a relatively low viscosity of the molding masses.

Preparation of Cured Molded Articles

Each of the molding masses obtained as described above was used to close a hole having a diameter of 1 cm that was previously formed in a PVC pipe having a diameter of 10 cm and to seal the pipe by means of frontal polymerization of the molding mass. Here, an amount of approximately 10 g of the molding mass was formed by hand to obtain a disc having a thickness of 3 cm and a diameter of 3 cm, which was put and pressed onto the hole to be closed and the outer perimeter of which was strongly pressed against the pipe. In all three cases, the modelling masses showed very good initial bonding to the PVC surface. Subsequently, the respective molded article was, at one location, heated for 3 s using a lighter (Examples 1 and 3) or irradiated for 3 s using an LED UV lamp Omnicure Series 2000 (Example 2), with the flame or the lamp being kept at a distance of approximately 2 cm from the side of the adhesive tape. In all three cases, the polymerization reaction thus initiated travelled through the entire adhesive mass of the adhesive tape in the form of a "curing front". In this way, the molded articles cured completely within 10-12 s, which corresponds to curing rates of approximately 15 cm/min.

The present invention thus provides a new method for preparing adhesive tapes as well as adhesive tapes thus prepared, by means of which bonding partners can be bonded with each other within a short time and in a very simple manner. Also, it provides a new method for preparing molded articles as well as molded articles thus prepared, by which method articles having different shapes can be formed and cured within a short time and in a very simple manner.

The invention claimed is:

1. A method of preparing an adhesive tape comprising using a polymerizable composition comprising cationically polymerizable monomers, at least one cationic polymerization initiator, and optionally one or more additives, as an adhesive mass, wherein the polymerizable composition comprises as the at least one cationic polymerization initiator:

A) a thermal cationic initiator, or

B) a combination of a cationic photoinitiator and a thermal free-radical initiator for inducing the polymerization of the cationically polymerizable monomers in such an amount that the heat energy released during polymerization is sufficient for causing cleavage of the thermal initiator, so that the adhesive mass is curable via a local impulse a) of thermal energy or b) of thermal energy and/or radiation energy through frontal polymerization, wherein the polymerizable composition is prepared by mixing all components contained therein, whereafter it is, as an adhesive mass, applied in the form of a layer a) onto a carrier or b) onto a release sheet to form a transfer adhesive tape; whereafter optionally the exposed surface of the layer is covered with a) a release sheet or b) another release sheet.

2. A method for preparing molded articles comprising using a polymerizable composition comprising cationically polymerizable monomers, at least one cationic polymerization initiator, and optionally one or more additives, wherein the polymerizable composition comprises as the at least one cationic polymerization initiator:

A) a thermal cationic initiator, or

B) a combination of a cationic photoinitiator and a thermal free-radical initiator for inducing the polymerization of the cationically polymerizable monomers in such an amount that the heat energy released during polymerization is sufficient in order to cause cleavage of the thermal initiator; and a molding mass is initially prepared by mixing all components contained therein and then molded into the desired shape, whereafter its frontal polymerization is induced by a local impulse of thermal energy and/or radiation energy in order to prepare a cured molded article;

wherein the polymerizable composition used as the molding mass is spreadable-pasty before molding and, for molding, is applied as a spackle, filler or mortar onto uneven surfaces or is solid, but plastically moldable, before molding and is used as a modelling mass or putty and molded into the desired shape manually or by means of a tool;

whereafter it is frontally polymerized in this shape;

and optionally wherein, before molding, one or more viscosity modifiers, thickeners and/or rheology modifiers are added to the polymerizable composition in order to adjust predefined viscosities or flow properties.

3. The method according to claim 1, wherein the thermal cationic initiator is selected from alkylbenzylsulfonium or alkylarylbenzylsulfonium, benzylpyridinium, methylimidazonium, benzylpyrazinium or substituted benzylphosphonium salts of non-nucleophilic bases of very strong acids as anions, wherein the cationic photoinitiator is optionally selected from alkylbenzylsulfonium or alkylarylbenzylsulfonium, benzylpyridinium, methylimidazolium, benzylpyrazinium or substituted benzylphosphonium salts of $B(C_6F_5)4$-, $SbF_6^-$, $AsF_6$—, $PF_6$— or $BF_4$— or the tetrakis(perfluoro-t-butyloxy)aluminate anion or mixtures thereof, and wherein the thermal cationic initiator is optionally selected from alkylbenzylsulfonium or alkylarylbenzylsulfonium salts of $SbF_6$— or the tetrakis(perfluoro-t-butyloxy)aluminate anion.

4. The method according to claim 1, wherein:

i) the cationic photoinitiator is selected from aryl-substituted iodonium, phosphonium, sulfonium, pyridinium or diazonium salts, wherein the cationic photoinitiator is optionally selected from diaryliodonium salts of non-nucleophilic bases of very strong acids as anions and mixtures thereof, wherein the cationic photoinitiator is optionally selected from diaryliodonium salts of $B(C_6F_5)4$-, $SbF_6$—, $AsF_6$—, $PF_6$—, $BF_4$— or the tetrakis(perfluoro-t-butyloxy)aluminate anion or mixtures thereof; and/or ii) the thermal free-radical initiator is selected from benzopinacol or derivatives thereof, peroxides or azo compounds, wherein the thermal free-radical initiator is optionally selected from benzopinacol, dibenzoylperoxide or azobis(isobutyronitrile), wherein the thermal free-radical initiator is optionally benzopinacol.

5. The method according to claim 1, wherein the cationic photoinitiator is selected from (4-octyloxyphenyl)(phenyl) iodonium hexafluoroantimonate, bis(4-dodecylphenyl)iodonium hexafluoroantimonate, (4-isopropylphenyl)(4'-methylphenyl)iodonium tetrakis(pentafluorophenyl)borate, or iodonium salts of the tetrakis(perfluoro-t-butyloxy)-aluminate anion.

6. The method according to claim 1, wherein the cationic polymerizable monomers are selected from monovalent or multivalent epoxides (oxiranes), thiiranes (episulfides), oxetanes, lactams, lactones, lactides, glycolides, tetrahydrofuran or mixtures thereof.

7. The method according to claim 1, wherein in the polymerizable composition, a) the thermal cationic initiator is present in a proportion of 0.5 to 6 wt. %-based on the total weight of the cationic polymerizable monomers; or b1) the cationic photoinitiator and the thermal free-radical initiator of the initiator combination are present in a molar ratio of 1:0.5 to 1:45; and/or b2) the initiator combination is present in a proportion of 0.5 to 12 wt. % based on the total weight of the cationic polymerizable monomers.

8. The method according to claim 1, wherein the polymerizable composition further comprises additives selected from the group consisting of thickeners and rheology modifiers, coupling agents, tackifiers, network, impact strength and surface modifiers, film-forming agents, wetting agents, pigments, coloring agents, stabilizers, control agents, flame retardants or fillers, and/or radically polymerizable monomers.

9. The method according to claim 1, wherein the adhesive mass is applied in the form of a layer onto a carrier selected from paper, fabrics, non-woven materials, plastic foils, metal foils, foams, or combinations thereof, wherein the carrier is optionally fiber-reinforced.

10. An adhesive tape prepared by to the method according to claim 1.

11. A cured molded article prepared by to the method of claim 2.

12. The method according to claim 2, wherein the thermal cationic initiator is selected from alkylbenzylsulfonium or alkylarylbenzylsulfonium, benzylpyridinium, methylimidazonium, benzylpyrazinium or substituted benzylphosphonium salts of non-nucleophilic bases of very strong acids as anions, wherein the cationic photoinitiator is optionally selected from alkylbenzylsulfonium or alkylarylbenzylsulfonium, benzylpyridinium, methylimidazolium, benzylpyrazinium or substituted benzylphosphonium salts of $B(C_6F_5)4$-, $SbF_6^-$, $AsF_6$—, $PF_6$— or $BF_4$— or the tetrakis(perfluoro-t-butyloxy)aluminate anion or mixtures thereof, and wherein the thermal cationic initiator is optionally selected from alkylbenzylsulfonium or alkylarylbenzylsulfonium salts of $SbF_6$— or the tetrakis(perfluoro-t-butyloxy)aluminate anion.

13. The method according to claim 1, wherein:

i) the cationic photoinitiator is selected from aryl-substituted iodonium, phosphonium, sulfonium, pyridinium or diazonium salts, wherein the cationic photoinitiator is optionally selected from diaryliodonium salts of non-nucleophilic bases of very strong acids as anions and mixtures thereof, wherein the cationic photoinitiator is optionally selected from diaryliodonium salts of $B(C_6F_5)4$-, $SbF_6$—, $AsF_6$—, $PF_6$—, $BF_4$— or the tetrakis(perfluoro-t-butyloxy)aluminate anion or mixtures thereof; and/or ii) the thermal free-radical initiator is selected from benzopinacol or derivatives thereof, peroxides or azo compounds, wherein the thermal free-radical initiator is optionally selected from benzopinacol, dibenzoylperoxide or azobis(isobutyronitrile), wherein the thermal free-radical initiator is optionally benzopinacol.

14. The method according to claim 2, wherein the cationic photoinitiator is selected from (4-octyloxyphenyl)(phenyl) iodonium hexafluoroantimonate, bis(4-dodecyl-phenyl)iodonium hexafluoroantimonate, (4-isopropylphenyl)(4'-methylphenyl) iodonium tetrakis-(pentafluorophenyl) borate, or iodonium salts of the tetrakis(perfluoro-t-butyloxy)aluminate anion.

15. The method according to claim 2, wherein the cationic polymerizable monomers are selected from monovalent or multivalent epoxides (oxiranes), thiiranes (episulfides), oxetanes, lactams, lactones, lactides, glycolides, tetrahydrofuran or mixtures thereof.

16. The method according to claim 2, wherein in the polymerizable composition, a) the thermal cationic initiator is present in a proportion of 0.5 to 6 wt. %-based on the total weight of the cationic polymerizable monomers; or b1) the cationic photoinitiator and the thermal free-radical initiator of the initiator combination are present in a molar ratio of 1:0.5 to 1:45; and/or b2) the initiator combination is present in a proportion of 0.5 to 12 wt. % based on the total weight of the cationic polymerizable monomers.

17. The method according to claim 2, wherein the polymerizable composition further comprises additives selected from the group consisting of thickeners and rheology modifiers, coupling agents, tackifiers, network, impact strength and surface modifiers, film-forming agents, wetting agents, pigments, coloring agents, stabilizers, control agents, flame retardants or fillers, and/or radically polymerizable monomers.

\* \* \* \* \*